US012795355B2

(12) United States Patent
Subramanian et al.

(10) Patent No.: US 12,795,355 B2
(45) Date of Patent: Nov. 10, 2026

(54) SYSTEMS AND METHODS FOR ENABLING FABRIC DEVICE COMMISSIONING OVER WIRELESS LOCAL AREA NETWORK

(71) Applicant: Verizon Patent and Licensing Inc., Basking Ridge, NJ (US)

(72) Inventors: Ananthanarayanan Subramanian, Lewisville, TX (US); Venkatraman Parthasarathy, Chennai (IN); Srikamal Boyina, Visakhapatnam (IN); Anjaneya Pericharla, Irving, TX (US); Vinayaka Murthy Vijay, Bangalore (IN); Dinesh Pazhanivel, Chennai (IN); Ramayya Darbhamulla, Nashua, NH (US); Rasika Malinda Abeysinghe, Madison, NJ (US); Nishant Shrivastava, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 370 days.

(21) Appl. No.: 18/639,116

(22) Filed: Apr. 18, 2024

(65) Prior Publication Data

US 2025/0330807 A1 Oct. 23, 2025

(51) Int. Cl.

| | |
|---|---|
| ***H04W 12/04*** | (2021.01) |
| ***H04W 12/069*** | (2021.01) |
| ***H04W 12/60*** | (2021.01) |
| ***H04W 48/08*** | (2009.01) |
| ***H04W 76/10*** | (2018.01) |

(52) U.S. Cl.

CPC ......... *H04W 12/04* (2013.01); *H04W 12/069* (2021.01); *H04W 12/66* (2021.01); *H04W 48/08* (2013.01); *H04W 76/10* (2018.02)

(58) Field of Classification Search

None

See application file for complete search history.

(56) References Cited

U.S. PATENT DOCUMENTS

| | | | | |
|---|---|---|---|---|
| 11,575,759 | B1 * | 2/2023 | Robinson | H04W 12/06 |
| 11,626,974 | B2 * | 4/2023 | Zimmerman | H04L 9/3297<br>713/171 |
| 11,627,107 | B2 * | 4/2023 | Lau | H04L 61/106<br>370/328 |
| 2014/0354161 | A1 * | 12/2014 | Aggarwal | H05B 47/175<br>315/153 |
| 2017/0353859 | A1 * | 12/2017 | Idnani | H04W 12/08 |
| 2024/0007323 | A1 * | 1/2024 | Lee | H04L 12/2807 |

* cited by examiner

*Primary Examiner* — Adolf Dsouza

(57) ABSTRACT

A device includes a processor. The processor may be configured to: commission a fabric device over a Bluetooth® Low Energy (BLE) connection between the device and the fabric device; and send a code to a router on a wireless local area network (WLAN) to enable the router to commission the fabric device for a fabric on the WLAN.

20 Claims, 10 Drawing Sheets

SYSTEMS AND METHODS FOR ENABLING FABRIC DEVICE COMMISSIONING OVER WIRELESS LOCAL AREA NETWORK

BACKGROUND INFORMATION

Interoperability protocols enable interaction and communication between various smart devices and multiple platforms. For example, MATTER (or Matter®), a standard protocol, specifies a set of requirements for enhancing interoperability among smart home devices and ecosystems. MATTER ensures that devices that comply with the standard are compatible with various smart home platforms like Amazon Alexa®, Apple Homekit®, and Google Assistant®.

DETAILED DESCRIPTION

The following detailed description refers to the accompanying drawings. The same reference numbers in different drawings may identify the same or similar elements. As used herein, the term "fabric" may refer to a set of devices that may share the same security domain and communicate with one another in a secure manner. Each of the devices may be referred to as a fabric device. A fabric device may include, for example, a MATTER device (e.g., a device that is compliant with the MATTER standard or the MATTER protocol). The devices in a fabric may share the same certificate authority and top-level certificate, herein referred to as the root of trust certificate. Each fabric device in a fabric may include one or more nodes of the fabric. Each node may take on one or more roles, such as the role of a commissioner, a commissionee, a controller, and/or a controlee.

As used herein, the term "commissioning" may refer to, for a given fabric, the process of assigning security credentials (also referred to as fabric credentials) to a fabric device joining the fabric. A fabric device that commissions (e.g., assigns fabric credentials) to another fabric device may be referred to as a commissioner (or a commissioner device) and the fabric device which is commissioned by the commissioner may be referred to as a commissionee or a commissionee device (e.g., a fabric device to which the fabric credentials are assigned by the commissioner).

Systems and methods described herein relate to enabling fabric device commissioning over a wireless local area network (WLAN). To use a fabric device in a smart home environment, the fabric device (e.g., a smart lamp) needs to be commissioned and become part of the fabric on a WLAN serving the smart home environment. Although a fabric device which is on a WLAN is capable of being commissioned on the WLAN, a fabric device that is not configured with WLAN credentials may be unable to connect to the WLAN. The systems and methods described herein enable the fabric device to be commissioned on the WLAN.

According to various embodiments, the systems described herein may enable a fabric device to be commissioned on a WLAN by using a User Equipment device (UE) (e.g., a smart phone, tablet, etc.) to connect to the fabric device over a secure channel (e.g., a Bluetooth® Low Energy (BLE) channel) and perform bootstrap commissioning of the fabric device over the connection (also referred to as a starter channel or a starter connection). Via the bootstrap commissioning, the UE may configure the fabric device for the WLAN and have the fabric device attach to the WLAN. When the fabric device is on the WLAN, the fabric device may be commissioned for operation.

Figure 1:
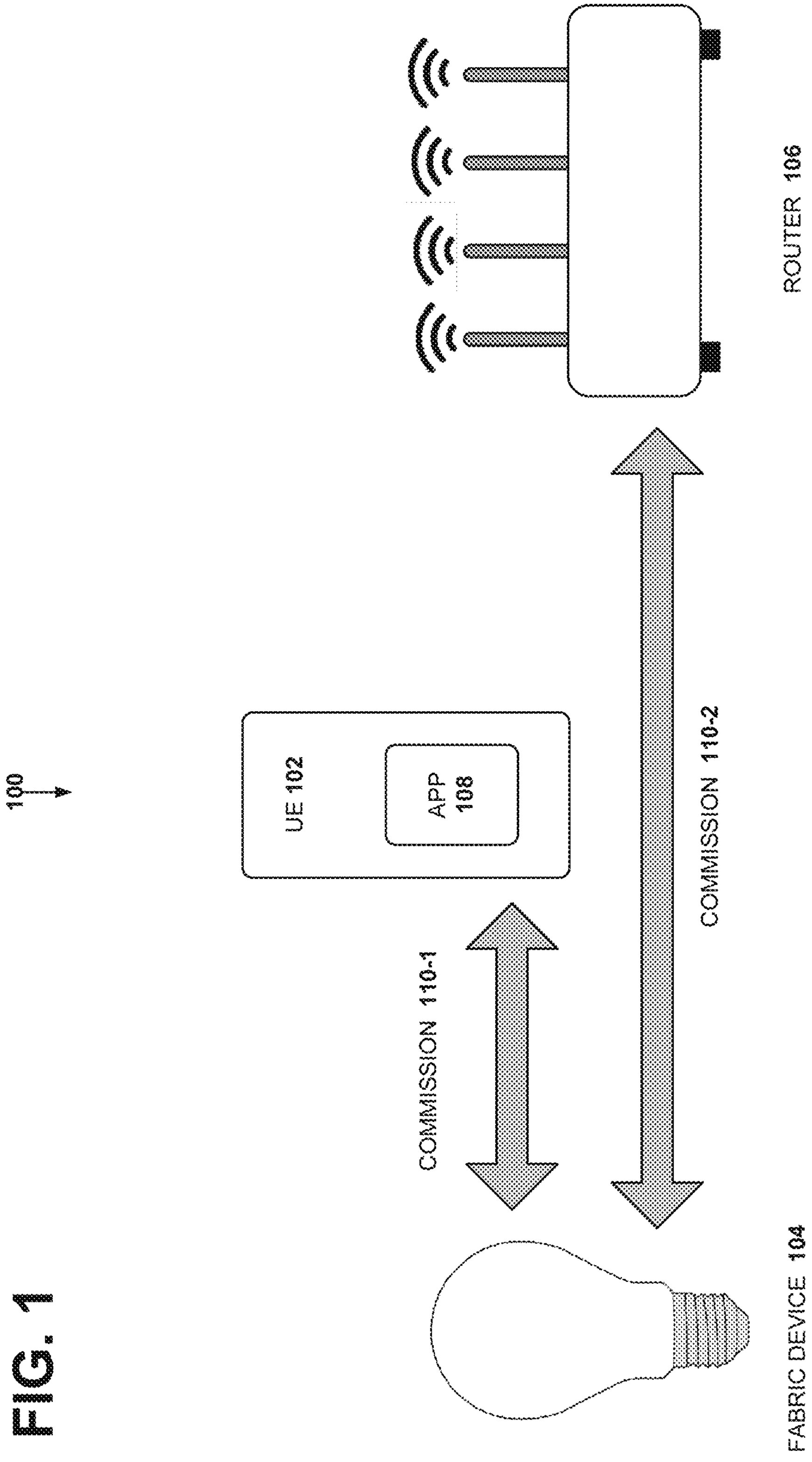
FIG. 1 illustrates an overview of a system for enabling fabric device commissioning over a wireless local area network (WLAN).

FIG. 1 illustrates an overview of a system for enabling fabric device commissioning over a WLAN. As shown, customer premises 100 may include a UE 102, a fabric device 104, and a router 106. These devices are described in greater detail with reference to FIGS. 2-9. Assume that fabric device 104 is not yet commissioned. For example, assume that fabric device 104 has been recently purchased and unboxed in customer premises 100 for use. Also assume that UE 102 includes an application 108 capable of bootstrap commissioning a fabric device over a starter connection; and assume that router 106 is on the WLAN (not shown in FIG. 1) and serves as a commissioner for the fabric on the WLAN.

When the user powers up fabric device 104, the user may set fabric device 104 in the discovery mode (herein also referred to as the discovery mode). Alternatively, upon initial power up, fabric device 104 may be automatically placed into discovery mode without manual selection by the user. When fabric device 104 is in the discovery mode, fabric device 104 may be ready to be commissioned over either a starter connection or a WLAN connection. In a smart home environment, it may be desirable to have fabric device 104 commissioned and controlled by router 106, rather than a mobile device (e.g., UE 102). However, because fabric device 104 is not yet configured to be connected to the WLAN, router 106 may not be able to commission fabric device 104 and have fabric device 104 join the fabric. Accordingly, the user of fabric device 104 needs to have fabric device 104 join the WLAN and place fabric device 104 in the discovery mode.

To have fabric device 104 connect to the WLAN, the user may use application 108 on UE 102 to bootstrap commission fabric device 104. The user may do so by selecting the commissioning option in application 108. Next, the user may input a bar code, a Quick Response (QR) code, or another code associated with fabric device 104 (e.g., scan a QR code printed on the body of fabric device 104 using a UE camera). Next, application 108 may establish a secure connection over a starter channel by using a passcode extracted from the payload of the code and complete bootstrap commissioning 110-1 over the secure \connection between UE 102 and fabric device 104. Bootstrap commissioning 110-1 may enable fabric device 104 to attach to the WLAN. When fabric device 104 connects to the WLAN, router 106 (which serves as the commissioner in the fabric on the WLAN) may discover fabric device 104. Router 106 may perform operational commissioning of fabric device 104 and have fabric device 104 join the fabric on the WLAN.

Figure 2:
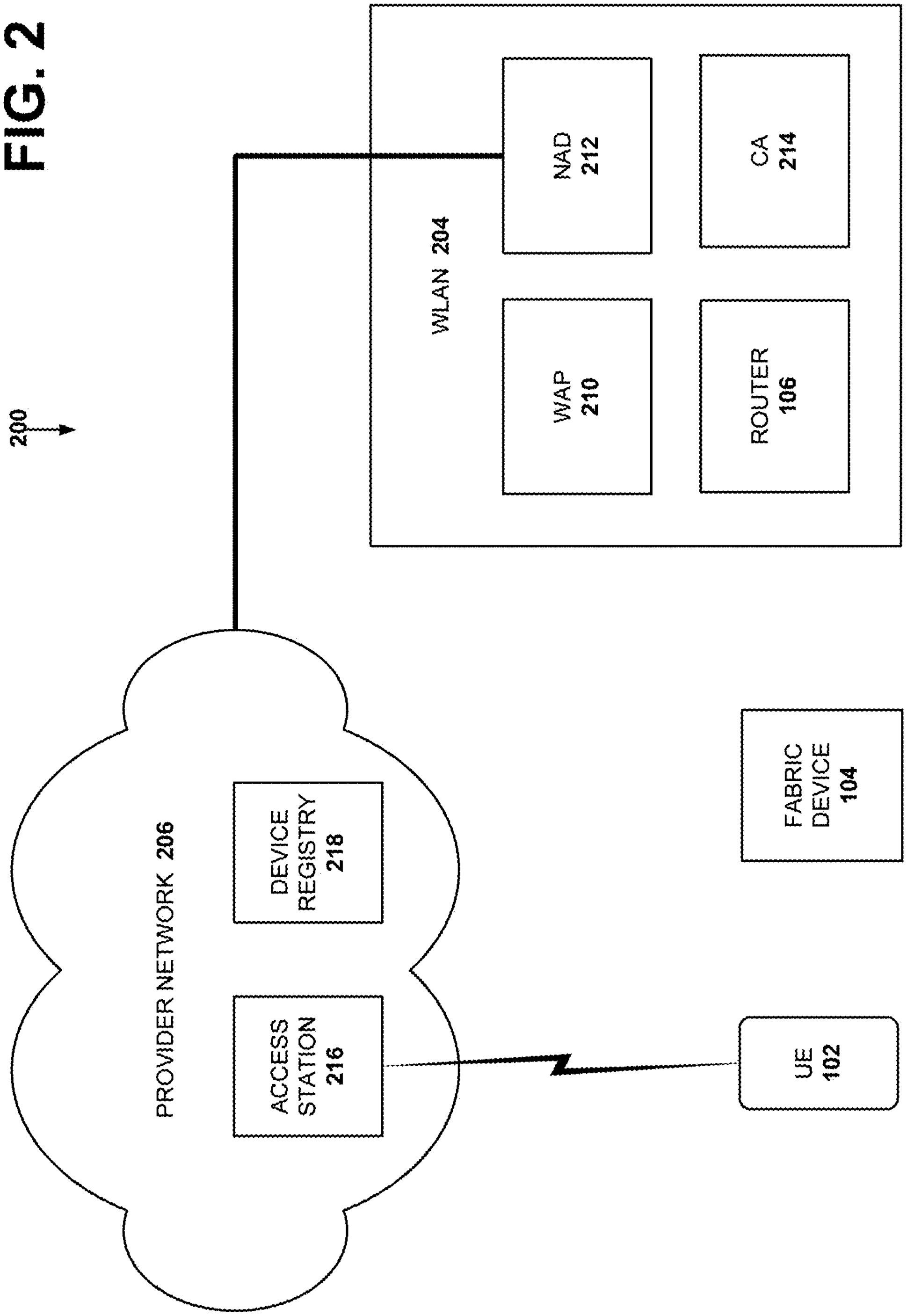
FIG. 2 illustrates an exemplary network environment in which a system for enabling fabric device commissioning over a WLAN may be implemented.

FIG. 2 illustrates an exemplary network environment 200 in which a system for enabling fabric device commissioning over a WLAN may be implemented. As shown, network environment 200 may include one or more of the following: UE 102, fabric device 104, WLAN 204, and provider network 206. UE 102 may include a wireless communication device capable of BLE communication, WLAN communication, Fifth Generation (5G) New Radio (NR) communication, and/or Fourth Generation (4G) (e.g., Long-Term Evolution (LTE)) communication, or a combination of BLE, WLAN, 5G and 4G communication (e.g., Evolved-Universal Terrestrial Radio Access-New Radio-Dual connectivity (EN-DC) communication). Examples of UE 102 include: a smart phone; a Fixed Wireless Access (FWA) device; a Customer Premises Equipment (CPE) device; a tablet device; a wearable computer device (e.g., a smart watch); a global positioning system (GPS) device; a laptop computer; a media playing device; a portable gaming system; an autonomous vehicle navigation system; a sensor, such as a pressure sensor; or an IoT device. In some implementations, UE 102 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Each UE 102 may include hardware components, application 108, an operating system, drivers, and interfaces that enable UE 102 to bootstrap commission fabric device 104. By bootstrap commissioning fabric device 104, UE 102 may enable fabric device 104 to be operationally commissioned by router 106 over WLAN 204.

fabric device 104 may include a commissionee device and thus capable of acting as a node in a fabric on WLAN 204. Examples of fabric device 104 include: lighting and electrical devices, such as a smart lamp or a smart light switch; a Heat, Air Ventilation, and Cooling (HVAC) control (i.e., a smart thermostat); an access control device such as a smart lock or a smart safe; a safety sensor (e.g., a motion sensor); an electronic device or appliance such as a smart television or a smart speaker; and a smart router or a smart bridge. When fabric device 104 is powered up, prior to any commissioning, a user may place fabric device 104 in the discovery mode. Once in the discovery mode, a commissioner may commission fabric device 104 over a starter communication link, such as a BLE link. If fabric device 104 is wirelessly connected to WLAN 204, a commissioner on WLAN 204 may commission fabric device 104.

WLAN 204 may include a wireless local area network (e.g., WI-FI network) whose components operate in accordance with various Institute of Electrical and Electronics Engineering (IEEE) 802.11 protocols. WLAN 204 may include devices that use radio waves to communicate in, for example, a 2.4 GHz band, a 5 GHz band, and/or a 6 GHz band, as well as other wired network devices, such as Ethernet devices. As shown, WLAN 204 may include a wireless access point (WAP) 210, a network access device (NAD) 212, router 106, and a certificate authority 214 (shown as CA 214). Although illustrated as four devices, the functionalities of WAP 210, NAD 212, router 108, and/or certificate authority 214 may be implemented on one device, two devices, or additional devices. For example, in one embodiment, certificate authority 214 may be hosted on router 106. In another example, a single FWA device may include WAP 210, NAD 212, and router 106. Although WLAN 204 may include devices other than WAP 210, NAD 212, router 108, and certificate authority 214, they are not illustrated in FIG. 2 for clarity.

WAP 210 may include a wireless access point via which one or more devices may wirelessly attach to and access WLAN 204. NAD 212 may permit devices of WAN 204 to access provider network 206. Examples of NAD 212 include: a FWA device that connects to a radio access network (e.g., a 5G mobile network) in provider network 206; and an optical network unit ONU that is connected to provider network 206 via an optical fiber.

Router 106 may route packets from a source device in WLAN 204 toward its destination device in WLAN 204. In one implementation, router 106 may host an application for managing fabric devices. The application may have been downloaded from provider network 206 and installed on router 108. In some embodiments, the application may be a MATTER application for managing matter devices. The application may enable router 106 to operate as a commissioner and/or a controller in the fabric on WLAN 204. As a commissioner, router 106 may commission fabric device 104 when fabric device 104 in the discovery mode attaches to WLAN 204.

Certificate authority 214 may receive, from a commissioner (e.g., UE 102 or router 106) in the security domain, a request for a certificate for a commissionee to operate as a node in the fabric. In response to the request, certificate authority 214 may generate a certificate (e.g., a Node Operational Certificate (NOC)) using a fabric device attestation signature (e.g., a MATTER device attestation signature) included in the request. Certificate authority 214 may provide the generated certificate, such as a NOC, to the commissioner. In addition, certificate authority 214 may provide a root certificate the commissioner.

Provider network 206 may include a local area network (LAN), a wide area network (WAN), a metropolitan area network (MAN), an autonomous system on the Internet, an optical network, a cable television network, a satellite network, another wireless network (e.g., a Code Division Multiple Access (CDMA) network, a general packet radio service (GPRS) network, and/or an LTE network), a telephone network (e.g., the Public Switched Telephone Network (PSTN) or a cellular network), an intranet, a terrestrial network, an ad hoc network, or a combination of networks.

Provider network 206 may permit UE 102 or devices in WLAN 204 to attach to provider network 206, establish sessions with devices in or attached to provider network 206, and/or receive services from provider network 206 (e.g., receive content, access the Internet, conduct video conferences with other UEs 102 attached to provider network 204). To deliver services, provider network 206 may interface with other networks (e.g., the Internet).

In some implementations, provider network 206 may include radio access networks, such as an LTE radio network, a 5G NR network, or another advanced radio network. The radio networks may include many central units (CUs), distributed units (DUs), radio units (RUs), and base stations, one of which is illustrated in FIG. 2 as access station 216, for establishing and maintaining one or more over-the-air channels with UE 102 and/or NAD 212. Access station 216 or another device in provider network 206 may permit application 108 to be downloaded to UE 102 or another application or components associated with fabric device management to be downloaded to router 214 for installation and execution.

As further shown, provider network 206 may include a device registry 218 (e.g., a Distributed Compliance Ledger (DCL)). In some embodiments, device registry 218 may be included in a network different from provider network 206 but still accessible by UE 102 or devices in WLAN 204 (e.g., via the Internet or provider network 206). Device registry 218 may receive requests from a commissioner to verify fabric device certificates (e.g., a Device Attestation Certificate, a Product Attestation Certificate, etc.) and return an indication whether the certificates are valid (e.g., return a message signed by an attestation private key) to the commissioner.

For clarity, FIG. 2 does not show all components that may be included in network environment 200 (e.g., routers, bridges, additional UEs 102, additional WLANs 204, additional access stations 216, data centers, portals, etc.). Depending on the implementation, network environment 200 may include additional, fewer, different, or a different arrangement of components than those illustrated in FIG. 2. Furthermore, in different implementations, the configuration of network environment 200 may be different.

Figure 3:
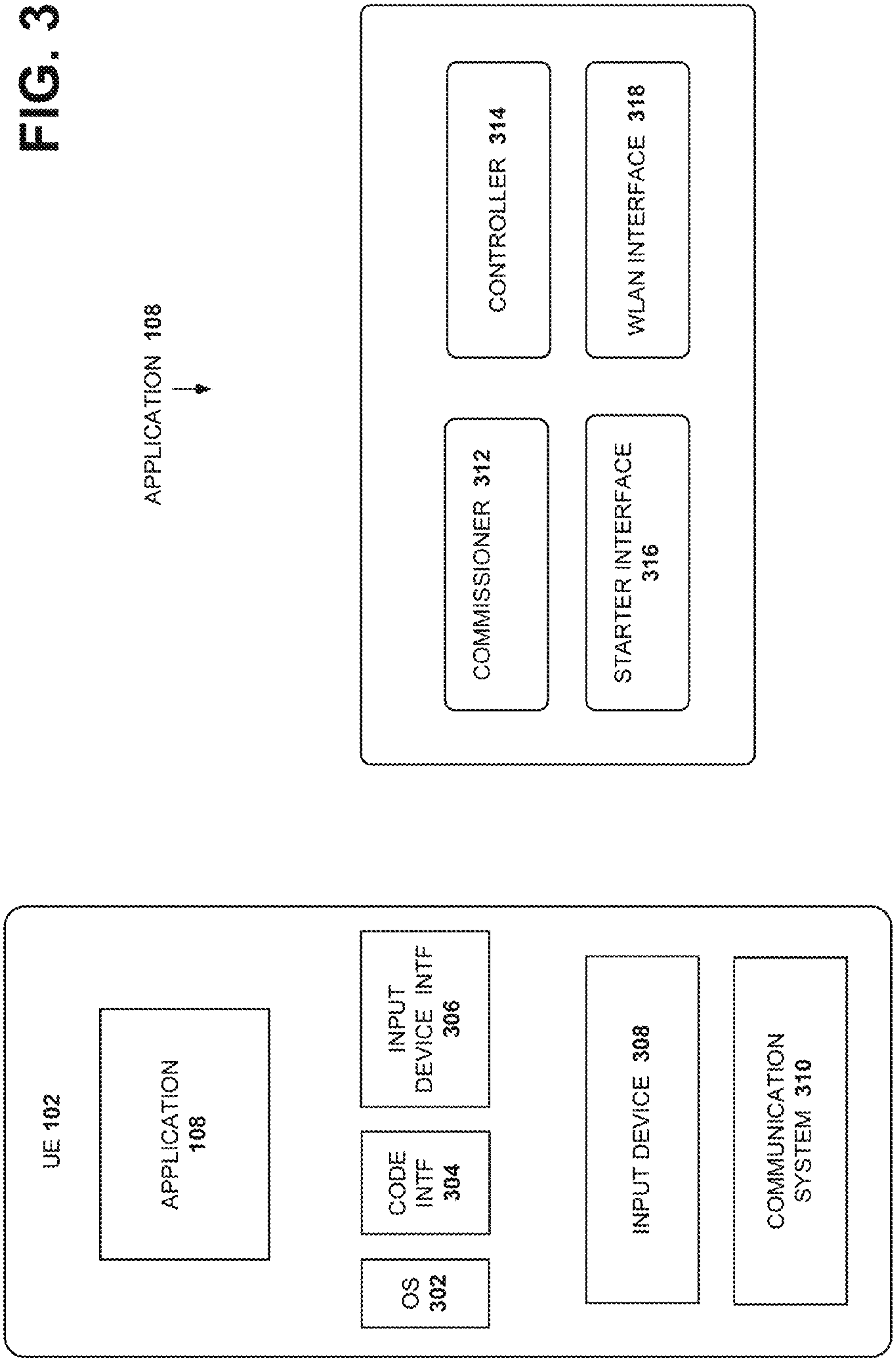
FIG. 3 depicts example components of a User Equipment device (UE) in a system for enabling fabric device commissioning over a WLAN, according to an implementation.

FIG. 3 depicts example components of UE 102 according to an implementation. As shown, UE 102 may include application 108, an operating system (OS) 302, a code interface 304, an input device interface 306, one or more of input device 308, and a communication system 310. Although UE 102 may include other components (e.g., components for email, calendar, browsing, messaging, Voice-over-Internet Protocol (VOIP) communication, videoconferencing, etc.), they are omitted in FIG. 3 for clarity.

Application 108 may permit UE 102 to function as a node on a fabric or as a fabric device. In particular, application 108 may permit UE 102 to function as a commissioner and/or a controller. In operation, application 108 may obtain a passcode associated with fabric device 104 via code interface 304 and/or input device interface 306 (e.g., scan a QR code, a bar code, etc.) from fabric device 104 to begin and conduct bootstrap commissioning of fabric device 104. Near the completion of the bootstrap commissioning, application 108 may provide WLAN credentials to fabric device 104. In addition, application 108 may use the multi-admin capability (e.g., the capability of fabric device 104 to be commissioned on multiple fabrics) to put fabric device 104 in the discovery mode. Next, application 108 may make an application programming interface (API) call to another application hosted by router 106 to provide the passcode of fabric device 104 to the application without user intervention.

Operating system 302 may manage application 108, memory, computational cycles, and/or other resources on UE 102. Additionally, operating system 302 may relay connection requests from application 108 to communication system 310 and relay messages/notifications that arrive at communication system 310 from WLAN 204, provider network 206, and/or devices connected to UE 102 via starter connections to application 108. Operating system 302 may relay API calls from application 108 to other components of UE 102, such as code interface 304 and/or input device interface 306 and vice versa.

Code interface 304 may receive calls from application 108 and/or other components of UE 102 and render services related to acquisition of codes (e.g., bar code, QR code, numerical code, etc.) via input device 308. Input device interface 306 may operate in conjunction with code interface 304 to obtain codes from fabric device 104 via input device 308 on UE 102. Input device 308 may include one or more input devices, such as digital cameras, a touch screen, a bar code scanner (e.g., attached via a wireless connection or a cable), or another type of input mechanism.

Communication system 310 may perform communication-related functions, including establishing connections between UE 102 and another end point (e.g., fabric device 104, a device in provider network 206, a device in WLAN 204 such as router 106, etc.). Communication system 310 may include hardware components for BLE communication, WLAN communication, cellular communication (e.g., 5G NR communication, LTE communication, etc.), and/or another communication system. Communication system 310 may perform processing not only at lower layers of communication (e.g., modulation/demodulation, digital signal processing, etc.) but also at higher levels, such as session establishment.

As further shown in FIG. 3, application 108 may include a commissioner 312, a controller 314, a BLE interface 316, and a WLAN interface 318. Depending on the implementation, application 108 may include additional, fewer, or different components than those illustrated in FIG. 3 (e.g., another type of communication interface). Furthermore, in other implementations, one or more functions described as being performed by one component may be performed by one or more other components.

Figure 4:
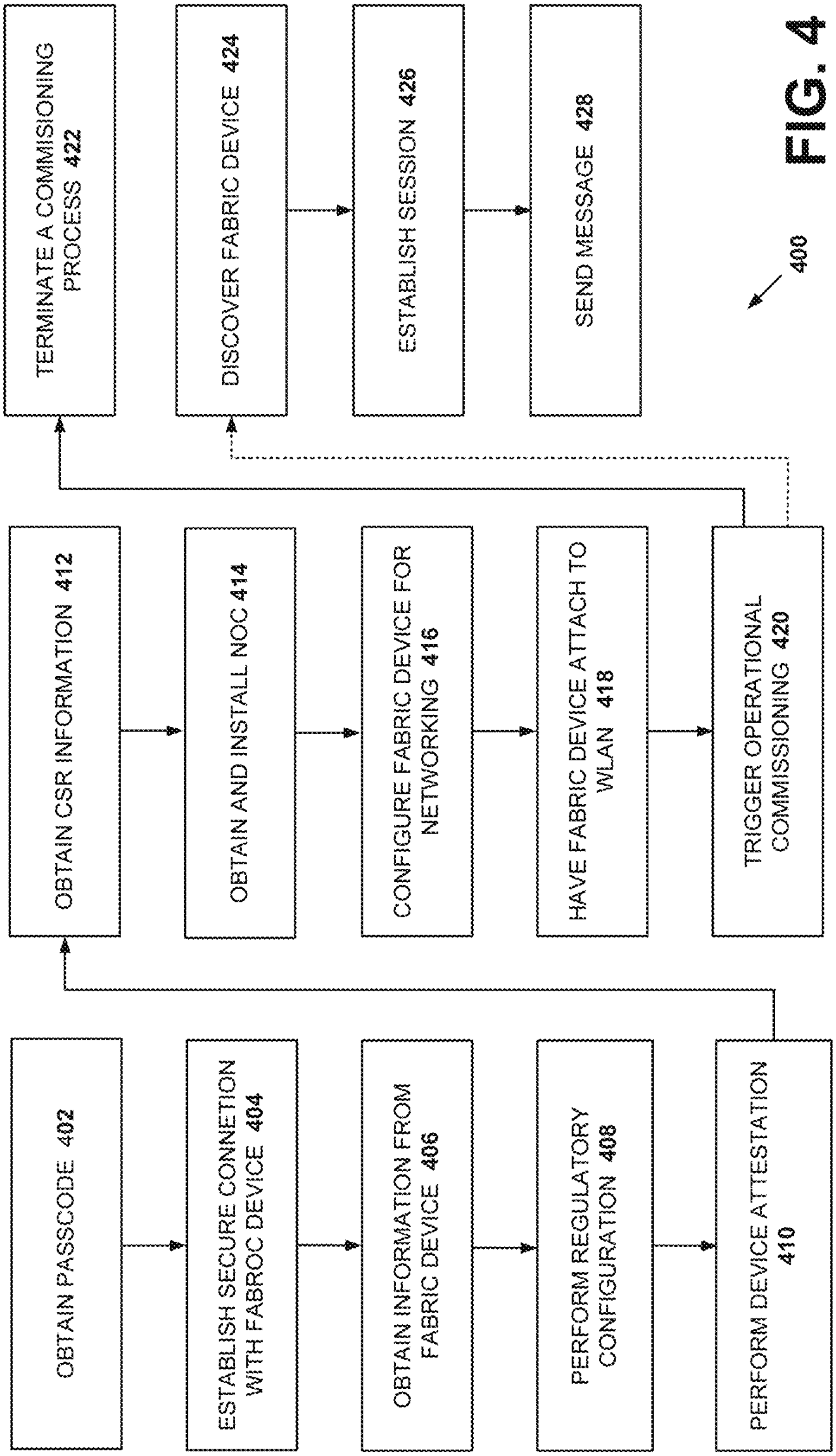
FIG. 4 is a flow diagram of an example process associated with bootstrap commissioning of a fabric device according to an implementation.

As described herein, commissioner 312 may bootstrap commission fabric device 104 to facilitate joining of fabric device 104 onto a particular fabric. FIG. 4 is a flow diagram of an example process 400 associated with bootstrap commissioning of fabric device 104. Process 400 may be performed by commissioner 312 and/or other devices and components in FIGS. 1 and 2. For the following, assume that fabric device 104 is in the discovery mode but is not configured to attach to WLAN 204. In addition, assume that application 108 is running on UE 102 and the user has navigated to the menus on application 108 to initiate bootstrap commissioning.

As shown, process 400 may include obtaining a passcode of fabric device 104 (block 402). For example, commissioner 312 on UE 102 may invoke code interface 304 and/or input device interface 306 to read a code (e.g., QR code) for fabric device 104. The code may be printed on the body of fabric device 104; on a container (e.g., box) housing fabric device 104; or a document that accompanies fabric device 104. Commissioner 312 may obtain the payload of the input code via code interface 304 and/or input device interface 306 and extract the passcode from the payload.

Process 400 may further include establishing a secure link with fabric device 104 via a starter channel, such as a BLE channel (e.g., by using BLE interface 316). After establishing the connection, commissioner 312 may obtain information from fabric device 104 over the connection (block 406). The information may include a Device Attestation Certificate (DAC) and a Product Attestation Intermediate Certificate (PAIC) and/or other information. Next, commissioner 312 may perform regulatory configuration of fabric device 104 (block 408). The regulatory configuration may include, for example, setting a location of fabric device 104 (e.g., country code, zip code, address, etc.).

Process 400 may further include performing fabric device attestation (block 410). For example, commissioner 312 may send a request to attest the identity of fabric device 104 to device registry 218. Commissioner 312 may send the request via a broadband connection, a WLAN connection, and/or a connection via the Internet. The request may include the DAC and the PAIC, which commissioner 312 obtained at block 406. If device registry 218 validates the DAC and the PAIC, device registry 218 may return a response signed with a private key to commissioner 312.

Assuming that the fabric device attestation resulted in a successful verification of the fabric device identity, process 400 may further include obtaining Certificate Signing Request (CSR) information from fabric device 104 (block 412). For example, commissioner 312 may send a CSR request to fabric device 104. In response, fabric device 104 may generate and provide the CSR information to commissioner 312 over the BLE connection.

Process 400 may further include obtaining and installing a Network Operational Certificate (NOC) (block 414). For example, when fabric device 104 returns the CSR information to commissioner 312, commissioner 312 may send a NOC request to a certificate authority, such as certificate authority 214 on WLAN 204. In response, certificate authority 214 may generate a NOC and provide the NOC and a root certificate to commissioner 312. Upon receipt of the NOC and the root certificate from certificate authority 214, commissioner 312 may install the NOC and the root certificate on fabric device 104. Process 400 may further include configuring fabric device 104 for networking on WLAN 204 (block 416). More specifically, commissioner 312 may configure a Service Set Identifier (SSID) and a WLAN password on fabric device 104 for accessing WLAN 204. Next, commissioner 312 may ensure that fabric device 104 connects to WLAN 204 (e.g., instruct fabric device 104 co connect to WLAN 204) (block 418).

Process 400 may further include commissioner 312 triggering operational commissioning of fabric device 104 (block 420). For example, commissioner 312 may place fabric device 104 in the discovery mode and make an API call to router 106 to provide the passcode of fabric device 104. After the API call to router 106, depending on the implementation, commissioner 312 may either terminate the commissioning process, by removing itself as a commissioner of fabric device 104 (e.g., issue a command to remove itself as a commissioner) (block 422); or complete the commissioning process (blocks 424-428). If commissioner 312 is implemented to complete the commissioning process, commissioner 312 may perform a discovery procedure on WLAN 204 (block 424) to find fabric device '03 on WLAN 204, establish a session with fabric device 104 over WLAN 204 (which involves the use of the NOC) (block 426), and send a message indicating the completion of the commissioning to fabric device 104 over the session (block 428).

Referring back to FIG. 3, controller 314 may enable a user to control a controlee. For example, assume that fabric device 102 includes a smart lamp that is a controlee of controller 314. The user may turn on or turn off the smart lamp via controller 314. BLE interface 316 and WLAN interface 318 may provide mechanisms for components of UE 102 to access BLE and WLAN part of communication system 310. For example, commissioner 312 may connect to fabric device 104 over a BLE channel via BLE interface 316. In another example, when fabric device 104 is on WLAN 204, commissioner 312 may communicate with fabric device 104 over WLAN 204 via WLAN interface 318.

Figure 5:
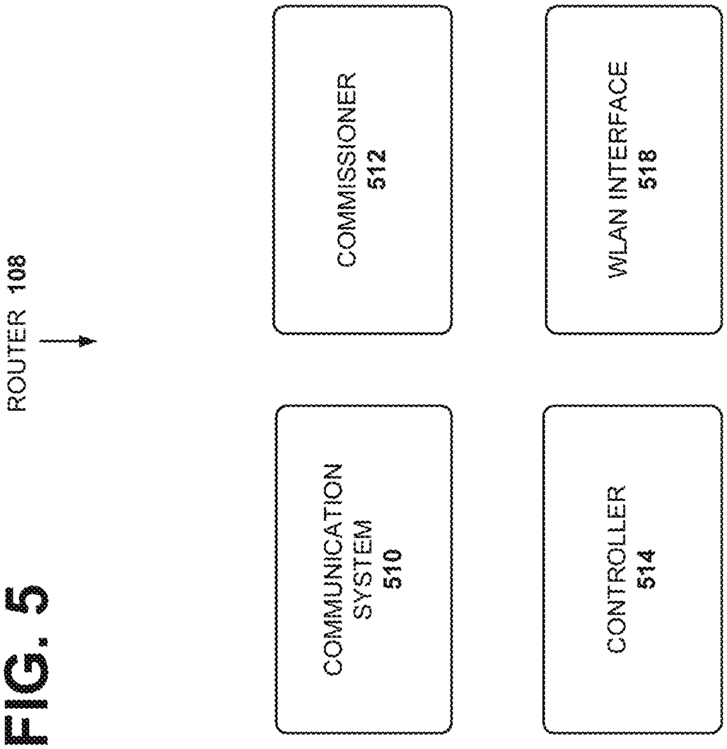
FIG. 5 illustrates example components of a router, in a system for enabling fabric device commissioning over a WLAN, according to an implementation.

FIG. 5 illustrates example components of router 106 according to an implementation. As shown, router 106 may include a communication system 510, a commissioner 512, a controller 514, and a WLAN interface 516. Although router 106 may include other components (e.g., an operating system, a packet forwarding engine, a routing information base (RIB), a forwarding information base (FIB), etc.), for simplicity, they are not illustrated in FIG. 5. Depending on the implementation, for managing and handling fabric device 104, router 106 may include additional, fewer, or different components than those illustrated in FIG. 5.

Communication system 510 may include hardware and software components for router 106 to communicate with devices in WLAN 204 or a device in another network. In some implementations in which router 106 is implemented as a FWA or a CPE, communication system 502 may also include hardware and software components for cellular communication (e.g., 5G NR communication, 4G communication, etc.) or optical communication.

Figure 6:
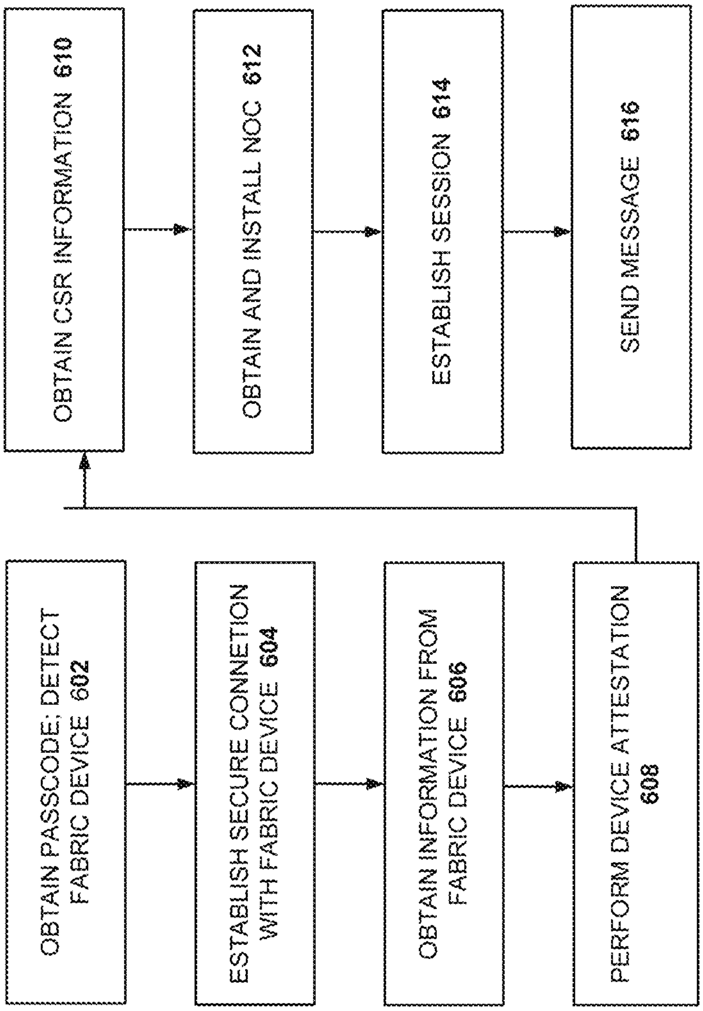
FIG. 6 is a flow diagram of an example process that is associated with operational commissioning of a fabric device, according to an implementation.

Commissioner 512 may function similarly as commissioner 312. In particular, commissioner 512 may perform operational commissioning of fabric device 104 after commissioner 312 on UE 102 bootstrap commissions fabric device 104. FIG. 6 is a flow diagram of an example process 600 that is associated with operational commissioning of fabric device 104. Process 600 may be performed by commissioner 512 and/or other devices and components in FIGS. 1 and 2. For the following, assume that UE 102 bootstrap commissioned fabric device 104; fabric device 104 is in the discovery mode; and fabric device 104 is attached to WLAN 204.

As shown, process 600 may include obtaining a passcode of fabric device 104 (block 602). For example, commissioner 512 on router 106 may receive the passcode from commissioner 312 on UE 102 via an API call made by commissioner 312. Also, commissioner 512 may detect fabric device 104 on WLAN 204 (block 602). Upon detecting fabric device 104 on WLAN 204, commissioner 512 may establish a secure link with fabric device 104 by using the passcode via a WLAN channel (block 604). After establishing the connection, commissioner 512 may obtain device information (e.g., the DAC and the PAIC and/or other information) from fabric device 104 over the connection (block 606).

Process 600 may further include performing fabric device attestation (block 608). For example, commissioner 512 may send a request to attest the identity of fabric device 104 to device registry 218. Commissioner 512 may send the request via a broadband connection, a WLAN connection, and/or a connection via the Internet. The request may include the DAC and the PAIC, which commissioner 512 obtained at block 606. In response, device registry 218 may return a response signed with a private key to commissioner 512. Assuming that the fabric device attestation resulted in a successful verification of the fabric device identity, process 600 may further include obtaining a CSR information from fabric device 104 (block 610). For example, commissioner 512 may send a CSR request to fabric device 104. In response, fabric device 104 may generate and provide the CSR information to commissioner 512 over the WLAN connection.

Process 600 may further include obtaining and installing a certificate, such as a NOC (block 612). For example, when fabric device 104 returns the CSR information to commissioner 512, commissioner 512 may send a NOC request to a certificate authority, such as certificate authority 214 on WLAN 204. In response, certificate authority 214 may generate a NOC and provide the NOC and the root certificate to commissioner 512. Upon receipt of the NOC and the root certificate from certificate authority 214, commissioner 512 may install the NOC and the root certificate on fabric device 104. Commissioner 512 may then establish a session with fabric device 104 over WLAN 204 (which involves the use of the NOC) (block 614), and send a message indicating the completion of the commissioning to fabric device 104 over the session (block 618).

Referring back to FIG. 5, controller 514 may control one or more fabric devices in the fabric on WLAN 204. In contrast to controller 314 that interacts with the user via its host device (e.g., UE 102), controller 514 may interact with the user via a client application (e.g., browser) on another device that provides the graphical user interface (GUI). WLAN interface 518 may operate similarly as WLAN interface 318 and provide mechanisms for other components of router 106 to access WLAN components in communication system 510. For example, commissioner 512 may interact with fabric device 104 on WLAN 204 via WLAN interface 518 and communication system 510.

Figure 7:
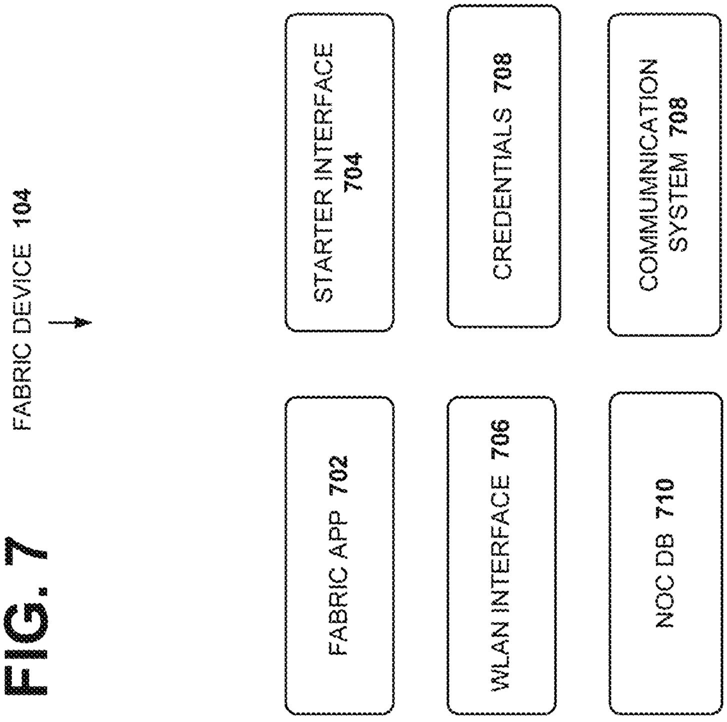
FIG. 7 shows example components of a fabric device according to an implementation.

FIG. 7 shows example components of a fabric device 104 according to an implementation. As shown, fabric device 104 may include a fabric application 702, a BLE interface 704, a WLAN interface 706, credentials 708, a NOC database (DB) 710, and a communication system 712. Although fabric device 104 may include other components (e.g., an operating system; hardware components for supporting appliance functionality of fabric device 104 (e.g., smart refrigerator functionality, smart TV functionality, etc.), for clarity, they are not illustrated in FIG. 7. Depending on the implementation, fabric device 104 may include additional, fewer, or different components than those illustrated in FIG. 7.

Fabric application 702 may implement a protocol for fabric device 104 to function as a valid on a fabric. For example, fabric application 702 may be implemented as a MATTER application. Such an application may establish a secure connection with commissioner 312 and/or commissioner 512 when commissioner 312/512 requests a secure connection using the passcode associated with fabric device 104. When requested by a commissioner, fabric application 702 may provide credentials (e.g., DAC and/or the PAIC) stored in credentials 708; provide CSR information when fabric application 702 receives a CSR request from a commissioner; install a NOC and/or a root certificate on behalf of a commissioner; conduct a secure session with another device on the fabric using the NOC; and/or provide a mechanism for receiving commands from a controller (e.g., controller 312 or controller 512) for controlling fabric device 104 (e.g., change settings on fabric device 104).

BLE interface 704 and WLAN interface 706 may enable components of fabric device 104 to access and use communication system 712. Credentials 708 may include the passcode, the DAC, the PAIC, other certificates, and/or credentials of fabric device 104. As mentioned above, the passcode may be provided as the payload of a printed code on the body of fabric device 104, on a document accompanying fabric device 104, and/or a container housing fabric device 104. The DAC and the PAIC may have been stored as part of credentials 708 on fabric device 104 by a seller or a manufacturer of fabric device 104.

NOC DB 710 may include one or more NOCs. Fabric device 104 may store more than one NOC, where each NOC permits fabric device 104 to operate on a different fabric. Communication system 712 may perform communication-related functions, including establishing connections between fabric device 104 and another end point device (e.g., UE 102, router 106, another fabric device, etc.). Communication system 712 may include hardware components for BLE communication and/or WLAN communication.

Figure 8A:
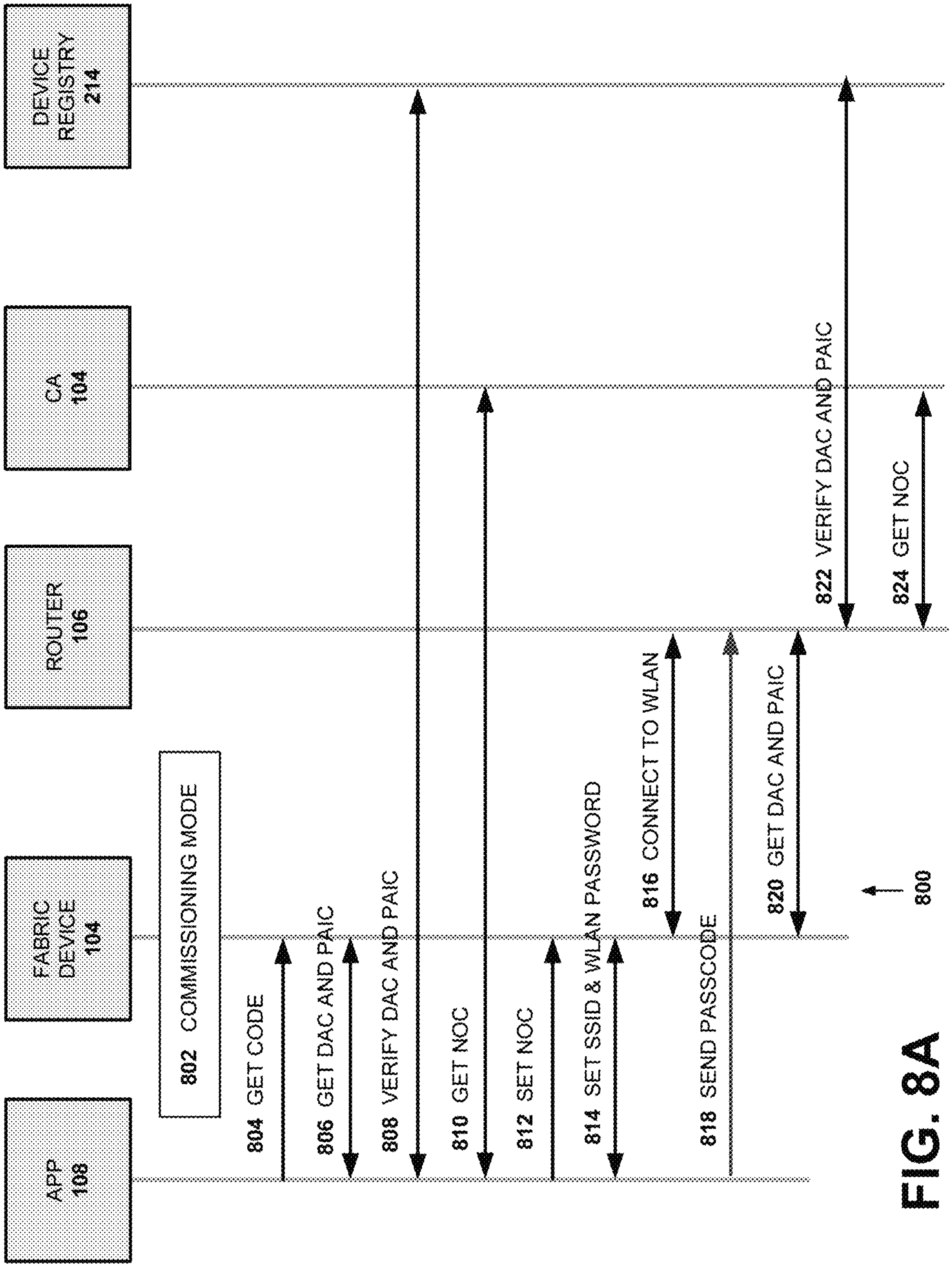
FIGS. 8A and 8B are event diagrams illustrating example interactions between components of a system during bootstrap commissioning and operational commissioning of a fabric device, according to an implementation.
Figure 8B:
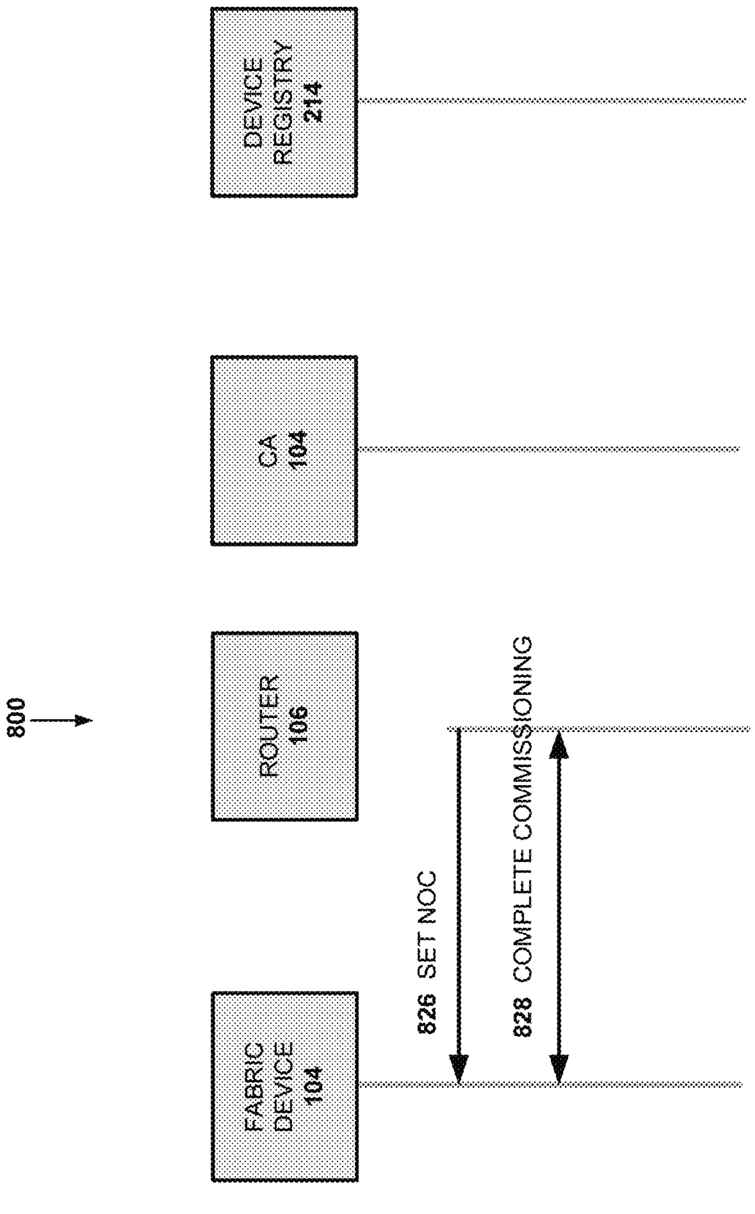

FIGS. 8A and 8B are event diagrams illustrating example interactions between components of a system during bootstrap commissioning and operational commissioning of fabric device 104. FIGS. 8A and 8B show many but not all of the vents described above with reference to FIGS. 4 and 6. As shown, events 800 may include fabric device 104 being set in the discovery mode (or discovery mode) (block 802). For example, the user of fabric device 104 may set the fabric device 104 in the discovery mode. Thereafter, UE 102 may obtain a code of fabric device 104 (e.g., QR code) (arrow 804); establish a secure starter connection (e.g., a BLE connection) with fabric device 104 using a passcode extracted from the code; and obtain the DAC and PAIC from fabric device 104 (arrow 806). UE 102 may also verify the DAC and the PAIC via device registry 218 (arrow 808).

Events 800 may further include UE 102 retrieving a NOC from certificate authority 214 (arrow 810); setting the NOC on fabric device 104 (arrow 812); and setting an SSID and a WLAN password on fabric device 104 (arrow 814). Fabric device 104 may then attach to or join WLAN 204 (arrow 816).

Events 800 may further include UE 102 sending the code or the passcode of fabric device 104 to router 106 (arrow 818) to trigger the operational commissioning of fabric device 104. Next, commissioner 512 on router 106 may obtain the DAC and the PAIC from fabric device 104 (arrow 820); verify the DAC and the PAIC via device registry 218 (arrow 822); retrieve a NOC from certificate authority 214 (arrow 824); and install the NOC on fabric device 104 (arrow 826; FIG. 8B). Commissioner 312 may complete the operational commissioning (arrow 828) by establishing a secure session with fabric device 104 over WLAN 204 and sending a message to fabric device 104 over the secure session, to notify fabric device 104 that commissioning of fabric device 104 on the fabric on WLAN 204 is complete.

Figure 9:
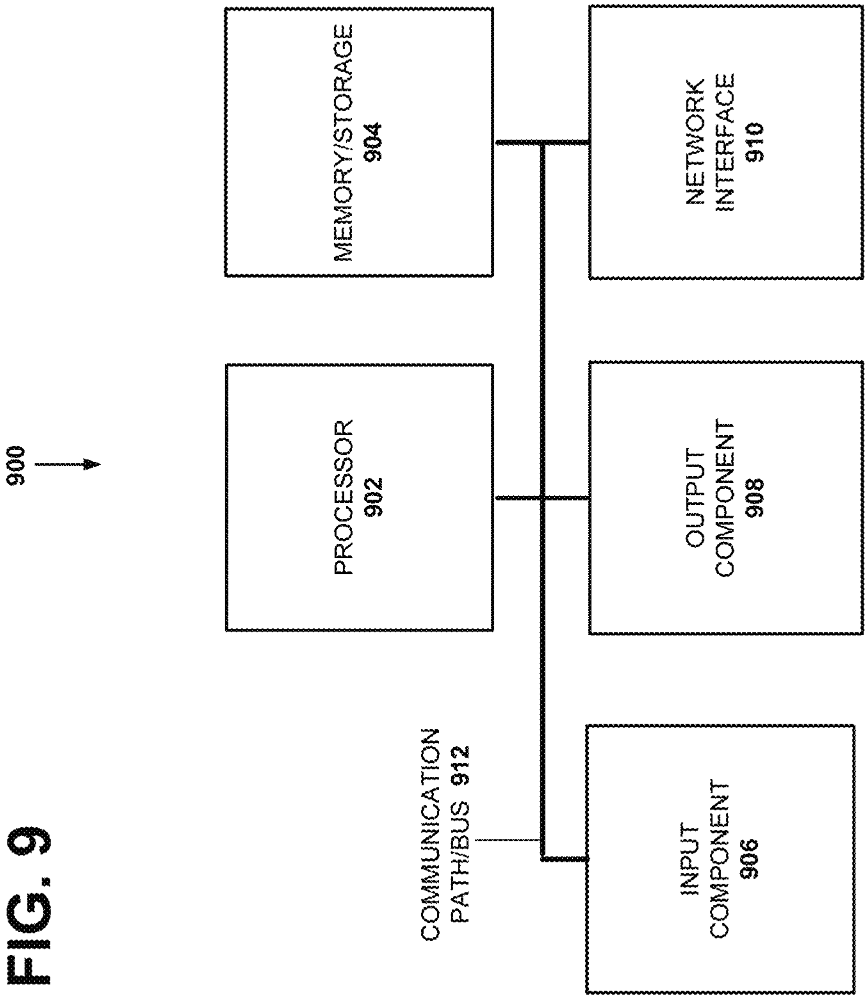
FIG. 9 depicts example functional components of a network device according to an implementation.

FIG. 9 depicts exemplary components of an exemplary network device 900. Network device 900 may correspond to or be included in any of the devices and/or components illustrated in FIGS. 1-3, 5, 7, and 8 (e.g., UE 102, WLAN 204, provider network 206, router 106, fabric device 104, WAP 210, NAD 212, certificate authority 214, access station 216, device registry 218, etc.). In some implementations, network devices 900 may be part of a hardware network layer on top of which other network layers and network functions (NFs) may be implemented.

As shown, network device 900 may include a processor 902, memory/storage 904, input component 906, output component 908, network interface 910, and communication path 912. In different implementations, network device 900 may include additional, fewer, different, or different arrangement of components than the ones illustrated in FIG. 9. For example, network device 900 may include line cards, switch fabrics, modems, etc.

Processor 902 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 900 and/or executing programs/instructions.

Memory/storage 904 may include static memory, such as read only memory (ROM), and/or dynamic memory, such as random access memory (RAM), or onboard cache, for storing data and machine-readable instructions (e.g., programs, scripts, etc.). Memory/storage 904 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 904 may be external to and/or removable from network device 900. Memory/storage 904 may include, for example, a Universal Serial Bus (USB) memory stick, a dongle, a hard disk, off-line storage, a Blu-Ray® disk (BD), etc. Memory/storage 904 may also include devices that can function both as a RAM-like component or persistent storage, such as Intel® Optane memories. Depending on the context, the term "memory," "storage," "storage device," "storage unit," and/or "medium" may be used interchangeably. For example, a "computer-readable storage device" or "computer-readable medium" may refer to both a memory and/or storage device.

Input component 906 and output component 908 may provide input and output from/to a user to/from network device 900. Input/output components 906 and 908 may include a display screen, a keyboard, a mouse, a speaker, a microphone, a camera, a DVD reader, USB lines, and/or other types of components for obtaining, from physical events or phenomena, to and/or from signals that pertain to network device 900.

Network interface 910 may include a transceiver (e.g., a transmitter and a receiver) for network device 900 to communicate with other devices and/or systems. For example, via network interface 910, network device 900 may communicate over a network, such as the Internet, an intranet, cellular, a terrestrial wireless network, a satellite-based network, optical network, etc. Network interface 910 may include a modem, an Ethernet interface to a LAN, and/or an interface/connection for connecting network device 900 to other devices. Communication path or bus 912 may provide an interface through which components of network device 900 can communicate with one another.

Network device 900 may perform the operations described herein in response to processor 902 executing software instructions stored in a non-transient computer-readable medium, such as memory/storage 904. The software instructions may be read into memory/storage 904 from another computer-readable medium or from another device via network interface 910. The software instructions stored in memory/storage 904, when executed by processor 902, may cause processor 902 to perform one or more processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, the terms "service provider" and "provider network" may refer to, respectively, a provider of communication services and a network operated by the service provider. The network may be a terrestrial network (e.g., a fiber optic network) or a cellular network. A cellular network may be uniquely identified by a Public Land Mobile Network (PLMN) Identifier (ID).

In the above, while series of actions, messages, and/or events have been described with reference to FIGS. 4, 6, 8A, and 8B, the order of the actions, messages, and events may be modified in other implementations. In addition, non-dependent actions, messages, and events may represent actions, messages, and events that can be performed, sent, and/or be caused to occur in parallel and in different orders. Furthermore, each of actions, messages, and events illustrated may include one or more other actions, messages, and/or events.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:

a processor configured to:

bootstrap commission a fabric device over a secure wireless connection between the device and the fabric device, wherein when bootstrap commissioning, the processor is configured to:

set wireless local area network (WLAN) parameters of the fabric device;

cause the fabric device to wirelessly connect to a WLAN; and place the fabric device in a discovery mode to enable the fabric device to be operationally commissioned by a router on the WLAN; and send a code to the router on the WLAN to enable the router to operationally commission the fabric device for a fabric on the WLAN.

2. The device of claim 1, wherein when bootstrap commissioning the fabric device, the processor is configured to:

scan a Quick Response (QR) code associated with the fabric device via a digital camera included in the device; and extract a payload of the QR code to obtain the code; and establish a Bluetooth® Low Energy (BLE) connection as the secure connection by using the code.

3. The device of claim 2, wherein when bootstrap commissioning the fabric device, the processor is further configured to:

obtain one or more certificates from the fabric device over the BLE connection; and validate the certificates.

4. The device of claim 3, wherein when validating the certificates, the processor is configured to:

send a request to attest the fabric device to a device registry.

5. The device of claim 1, wherein when bootstrap commissioning the fabric device, the processor is configured to:

obtain a Network Operational Certificate (NOC) from a certificate authority on the WLAN; and install the NOC on the fabric device.

6. The device of claim 5, wherein the router includes the certificate authority.

7. The device of claim 1, wherein when setting the WLAN parameters of the fabric device, the processor is configured to:

set, on the fabric device, a Service Set Identifier (SSID) and a password for accessing the WLAN.

8. The device of claim 1, wherein the router is configured to:

establish a secure connection between the router and the fabric device over the WLAN by using the code.

9. The device of claim 1, wherein the router is configured to:

obtain certificates from the fabric device over the WLAN; and request a device registry in a network different from the WLAN to validate the certificates.

10. The device of claim 1, wherein the router includes a device compliant with MATTER protocol.

11. A method comprising:

bootstrap commissioning a fabric device over a secure wireless connection between a device and the fabric device, the bootstrap commissioning includes:

setting wireless local area network (WLAN) parameters of the fabric device;

causing the fabric device to wirelessly connect to a WLAN; and placing the fabric device in a discovery mode to enable the fabric device to be operationally commissioned by a router on the WLAN; and sending a code to the router on the WLAN to enable the router to operationally commission the fabric device for a fabric on the WLAN.

12. The method of claim 11, wherein bootstrap commissioning the fabric device includes:

scanning a Quick Response (QR) code associated with the fabric device via a digital camera included in the device; and extracting a payload of the QR code to obtain the code; and establishing a Bluetooth® Low Energy (BLE) connection by using the code.

13. The method of claim 12, wherein bootstrap commissioning the fabric device further includes:

obtaining one or more certificates from the fabric device over the BLE connection; and validating the certificates.

14. The method of claim 13, wherein validating the certificates comprises:

sending a request to attest the fabric device to a device registry.

15. The method of claim 11, wherein bootstrap commissioning the fabric device comprises:

obtaining a Network Operational Certificate (NOC) from a certificate authority on the WLAN; and installing the NOC on the fabric device.

16. The method of claim 15, wherein the router includes the certificate authority.

17. The method of claim 11, wherein setting the WLAN parameters of the fabric device includes:

setting, on the fabric device, a Service Set Identifier (SSID) and a password for accessing the WLAN.

18. The method of claim 11, further comprising:

establishing, by the router, a secure connection between the router and the fabric device over the WLAN by using the code.

19. The method of claim 11, wherein the router includes a device compliant with MATTER protocol.

20. A non-transitory computer-readable medium comprising processor-executable instructions, which, when executed by a processor included in a device, cause the processor included in a device to:

bootstrap commission a fabric device over a secure wireless connection between the device and the fabric device, wherein when bootstrap commissioning, the processor is configured to:

set wireless local area network (WLAN) parameters of the fabric device;

cause the fabric device to wirelessly connect to a WLAN; and place the fabric device in a discovery mode to enable the fabric device to be operationally commissioned by a router on the WLAN; and send a code to the router on the WLAN to enable the router to operationally commission the fabric device for a fabric on the WLAN.

* * * * *